United States Patent [19]
Bando

[11] 3,841,027
[45] Oct. 15, 1974

[54] GLASS PLATE EDGE GRINDING MACHINE
[75] Inventor: Shigeru Bando, Tokushima, Japan
[73] Assignee: Bando Kiko Co., Ltd., Tokushima City, Japan
[22] Filed: Jan. 4, 1974
[21] Appl. No.: 430,689

[52] U.S. Cl.................. 51/110, 51/215 E, 198/165
[51] Int. Cl............................................. B24b 9/00
[58] Field of Search .... 51/74 R, 76 R, 76 BS, 80 A, 51/110, 138, 215 E, 168, 240 GB; 198/165

[56] References Cited
UNITED STATES PATENTS
| | | | |
|---|---|---|---|
| 2,551,332 | 5/1951 | Moore | 51/110 |
| 2,578,789 | 12/1951 | Donnelly | 51/110 |
| 3,007,288 | 11/1961 | Brewin | 51/110 |

*Primary Examiner*—Al Lawrence Smith
*Assistant Examiner*—Nicholas P. Godici

[57] ABSTRACT

A glass plate edge grinding machine in which the belt of one belt-conveyor is supported by a plural number of pressing rollers arranged in a series inside said belt while the belt of the other conveyer is disposed on the opposite side with the interposition of the glass plate to the position of the arranged grinding wheels and supported all over the length thereof by a rigid backing-up plate disposed inside said belt, said backing-up plate being smoothly curved from the upper end to the lower end thereof in the direction far away from the glass plate so as to face the belt of said other conveyer, the glass plate is pressed in accordance with the curved surface of the backing-up plate when held through the belt on either side by pressing rollers, and the spindle of each grinder holding a grinding wheel is supported by a spindle supporting assembly which enables said spindle to move substantially in the radial and axial directions.

5 Claims, 17 Drawing Figures

GLASS PLATE EDGE GRINDING MACHINE

Figure 1:
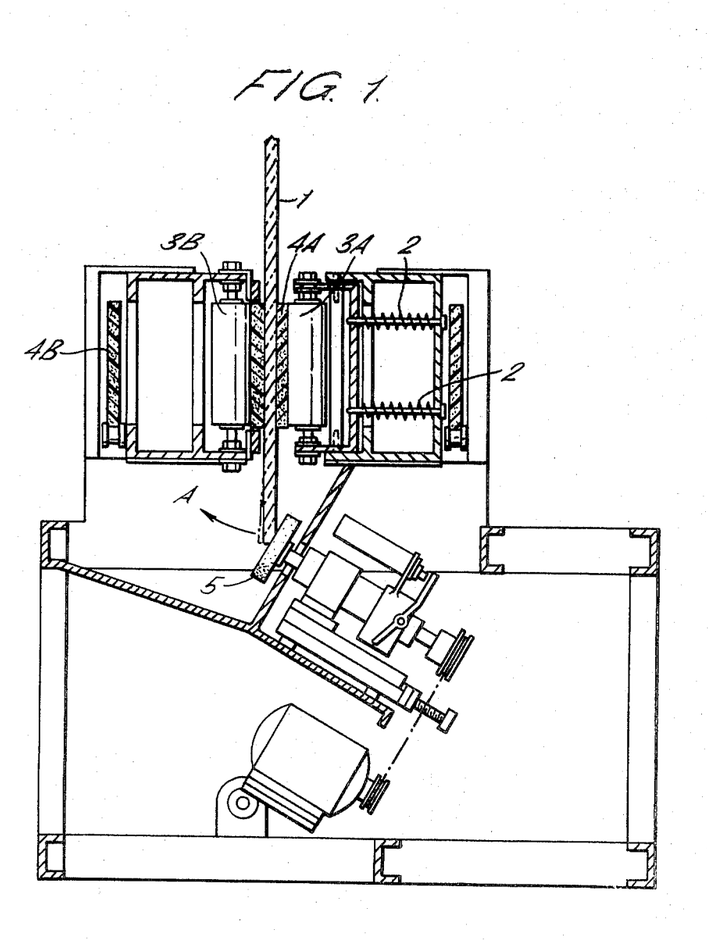
FIG. 1 is a cross section of a belt-conveyer of the conventional glass plate edge grinding machine.

The present invention relates to a glass plate edge grinding machine, especially to a machine for grinding the lower edge of a glass plate by means of a plural number of grinding wheels arranged in a series, which said glass plate being held between and transported by a pair of beltconveyers in such a manner that the glass plate is slightly inclined with respect to a vertical plane and supported at said inclined surface by a plural number of backing-up rollers. A machine of such a type is already known, but in a conventional machine, each of a pair of belt conveyers for conveying and holding therebetween glass plates extends between a pair of pulleys (one of them is a driving pulley), said each belt being adapted to be pressed against the glass surface by means of adjustable pressing rollers provided inside said each belt. Such pressing rollers are formed of rigid material for example iron or elastic material such as plastics or rigid rubber. Especially in case of a belt conveyer equipped with rigid pressing rollers, a spring means is provided for preventing the lateral displacement of glass plates in transportation which causes glass plates to intrude excessively into the grinder, said spring means resiliently supporting glass plates by pressing the same. For example, in a conventional grinding machine, a glass plate 1, which is pressedly supported thorough a pair of belt-conveyers 4A, 4B by pressing rollers 3A, 3B provided with spring means 2, 2 and ground by a rotating grinding wheel 5, moves a little away in the direction of the arrow A at the beginning of grinding, then returns to the starting position when grinding is finished. Therefore the glass plate portion ground at the beginning is different in amount from that at the termination of grinding, thus obtained glass plate making an ill figure. In other words, a glass plate is not ground uniformly from the beginning to the end. Further in this case, the pressing rollers are spaced from each other, so that if each pressing roller is not disposed on the opposite side through the glass plate to the corresponding grinding wheel, the glass plate passing through the grinding wheel is unsufficiently supported, thus pushed back in the direction of the load of the grinding wheel, and unsurely grounded.

The same is true with the case of belt-conveyers provided with resilient pressing rollers.

Figures 2, 3:
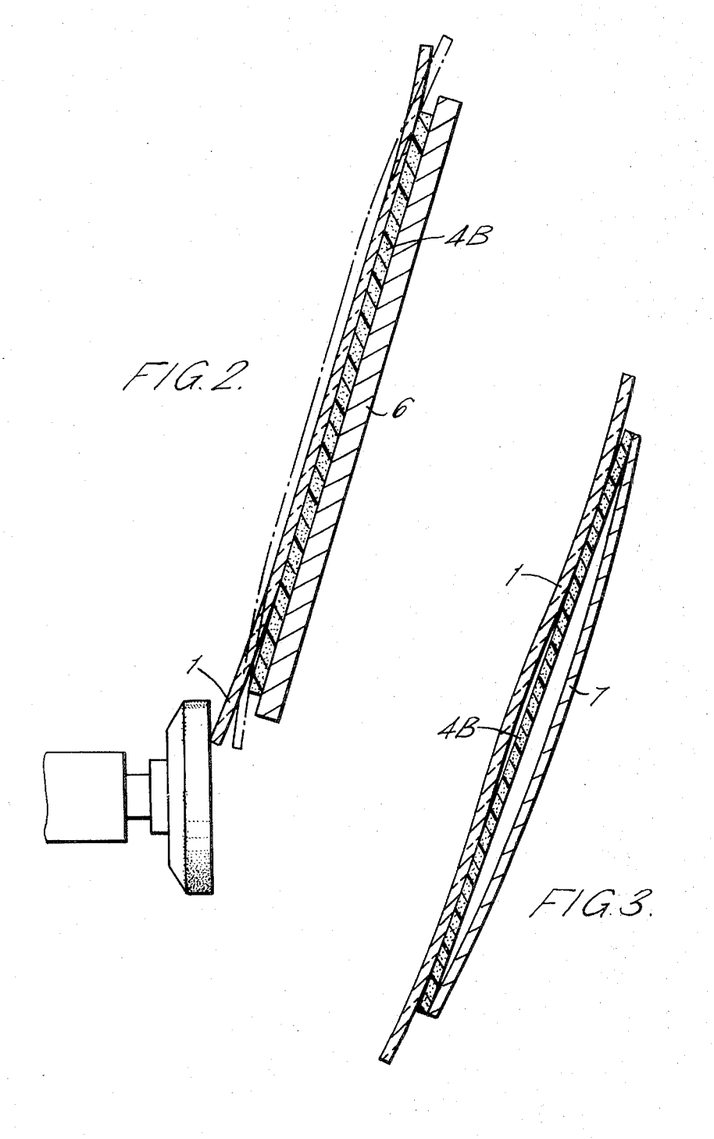
FIGS. 2 and 3 are schematic cross sections microscopically showing the waved surface of a glass plate.

To eliminate these disadvantages, it is suggested that a flat backing-up plate substitutes for a resilient roller or a spring equipped roller 3B provided on the side to receive the pressing force from a grinding wheel 5, said backing-up plate 6 being in contact with the reverse side of the belt-conveyer 4B and backing up the whole surface of the inside portion of the conveyer as shown in FIG. 2. A roller backs partially a glass plate up through a belt, but, on the contrary, said backing-up plate 6 backs the whole surface of glass plate up, thus solving abovementioned problems. However, a glass plate is, when macroscopically seen, wave-shaped as shown in FIG. 3. Therefore, the backing-up plate with a flat surface cannot thoroughly catch the glass plate surface within the surface of the backing-up plate. Particularly, in grinding a glass plate edge, it is necessary to surely and fixedly support the lower edge of a glass plate or the portion closest to the grinding wheel, because if not fixedly supported, the portion of the glass plate close to the grinding wheel will move freely thereby grinded portion is apt to be irregularly shaped.

In case of flat doubling plate, as apparent from FIG. 3, a gap is apt to be formed between a glass plate and the lower doubling plate in a edge portion of the glass plate close to the grinding wheel. If as shown in an imaginary line in FIG. 2, the portion of a glass plate close to the grinding wheel is occasionally convexed and said convexed portion is in contact with the backing-up plate, such a case is rare and it is impossible to apply such a flat backing-up plate to all the glass plates to be ground.

The thorough backing-up of glass plate surface, especially the lower end portion thereof is not achieved neither by a flat backing-up plate nor by the abovementioned roller.

Figure 4:
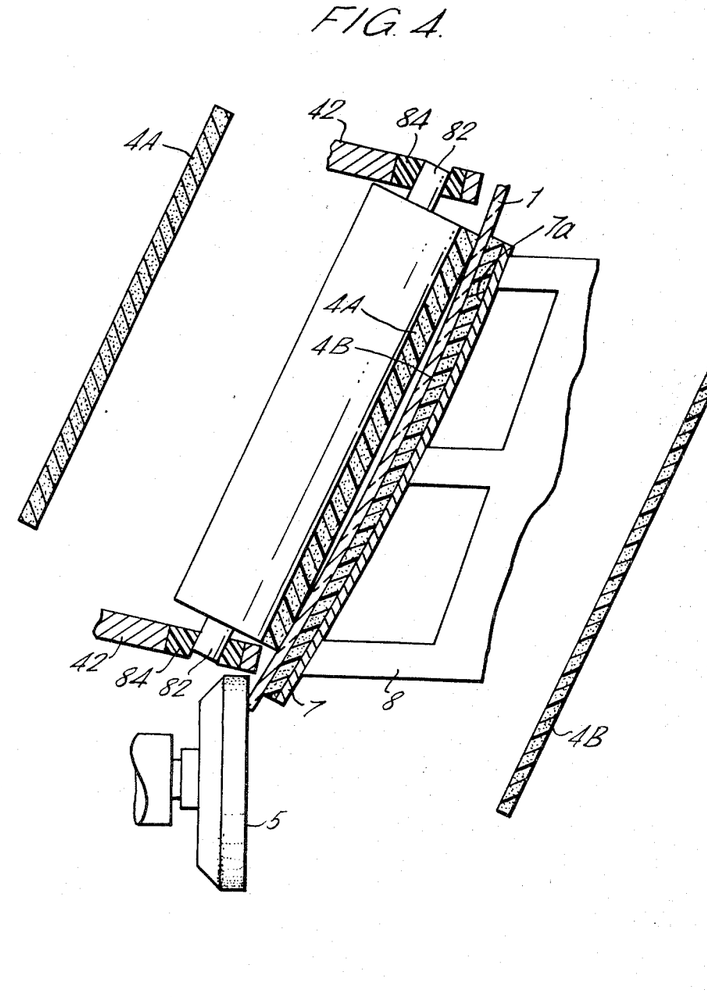
FIG. 4 is a schematic cross section showing the disposition of a backing-up plate with a curved surface and mechanism for supporting a pressing roller.

The main object of the present invention is to eliminate abovementioned disadvantages and especially to provide a backing-up plate which can surely support the lower edge of a glass plate close to a grinding wheel. The backing-up plate to achieve this object is, for example, a rigid plate 7 with a curved inside as shown in FIGS. 3, 4. By said curved rigid backing-up plate 7, the lower end portion of said backing-up plate can pressingly support at least the lower end of a glass plate 1 close to a grinding wheel by means of a belt 4.

That is, if a backing-up plate is flat as shown in FIG. 2, the resistance force of said backing-up plate is applied dispersedly on a glass plate by means of a belt, while in the curved rigid backing-up plate 7 the resilient force thereof is concentratedly applied on both sides of a glass plate 1. Therefore, glass plate portion close to the grind stone is sure to be fixedly supported, FIG. 4 shows a glass plate 1, clamped by a pair of conveyers 4A, 4B, being ground with a grinding wheel 5. Said glass plate 1 is supported by a backing-up plate with curved inside 7a which is fixed on a frame 8 by means of a belt conveyer, while it is deformed in a curved shape in accordance with the shape of the inside surface of said backing-up plate 7 by a resilient role 3 through the other belt conveyer 4A, so that the lower end of a glass plate close to the grinding wheel is sure to be fixedly supported at the lower end portion of the backing-up plate 7, preventing the glass plate from being displaced backward or vibrating due to grinding load of the grinding wheel. In addition, a rotary grind stone 5 is adapted to be displaced axially and radially by means of a spindle supporting assembly, avoiding the intrusion of a glass plate into the grind stone. Therefore, the glass plate is uniformly and smoothly ground through the length from the beginning to the termination.

Other objects, features and advantages of the present invention will become apparent from the following description of an embodiment of a glass plate edge grinding machine with reference to the appended drawings.

Figure 5:
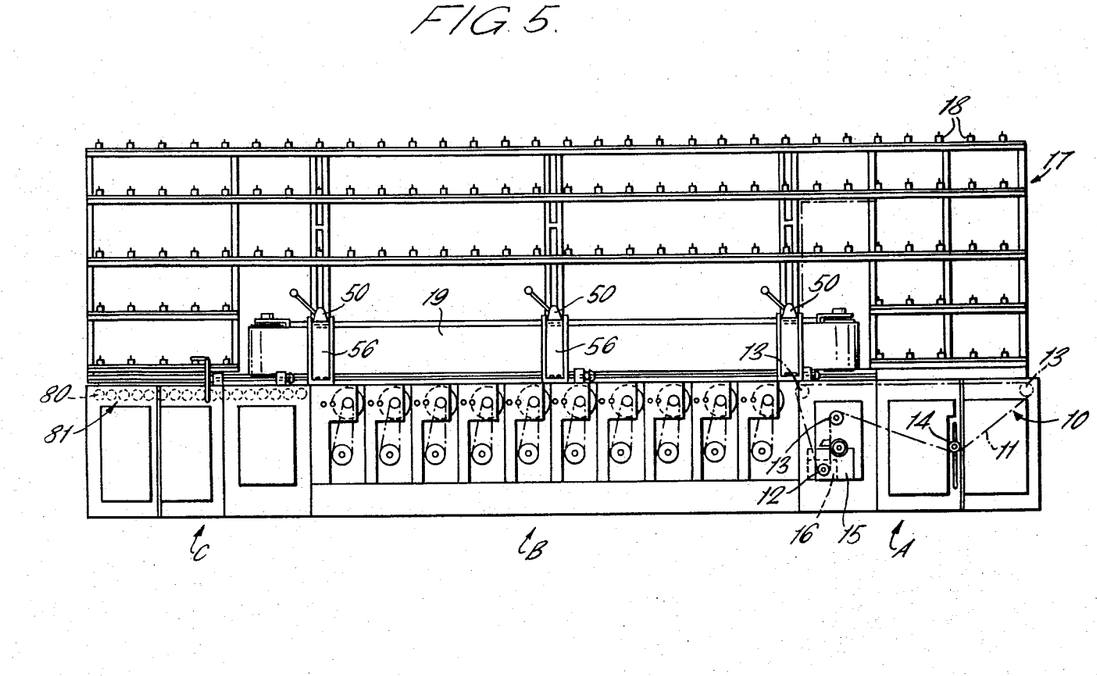
FIG. 5 is an elevation of an embodiment of a glass plate edge grinding machine according to the present invention.

Referring to FIG. 5, shown is whole of an example of glass plate edge grinding machine according to the present invention. Said glass plate edge grinding machine generally comprises a glass plate feeding section A, a glass plate grinding section B and glass plate delivering section C. In the glass plate feeding section A, provided is a belt-conveyer 10 for mounting the lower end of glass plates thereon to feed the same to the grinding section B. The belt-conveyer 10 comprises an endless belt 11 which travels over a driving pulley 12, a supporting pulley 13 and a tension pulley 14. The driving pulley 12 is fixed on an output axis of a reduction gear interlockingly connected to a prime mover.

A backing-up frame 17 is provided with a number of rollers 18 for supporting a glass plate in a position a little inclined with relation to a vertical plane.

In the glass plate grinding section B, a glass plate fed by the belt-conveyer 10 and continuously transported by a pair of belt-conveyers 19, 20 is ground at the one surface thereof by ten grinders 21 – 30 arranged in a series in the forwarding direction of glass plates.

Figure 6:
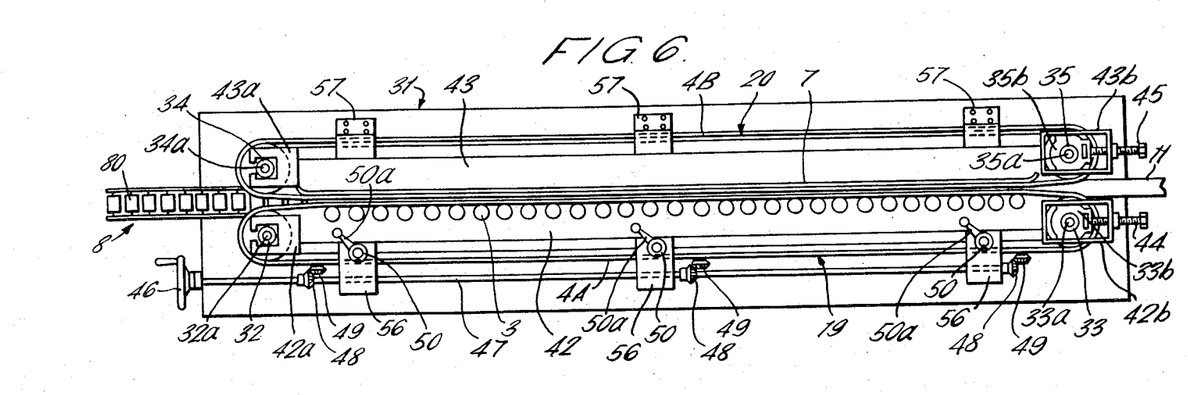
FIG. 6 is an plan view of a machine of FIG. 5, showing especially the position of a pair of belt-conveyers and a backing-up plate.
Figure 8:
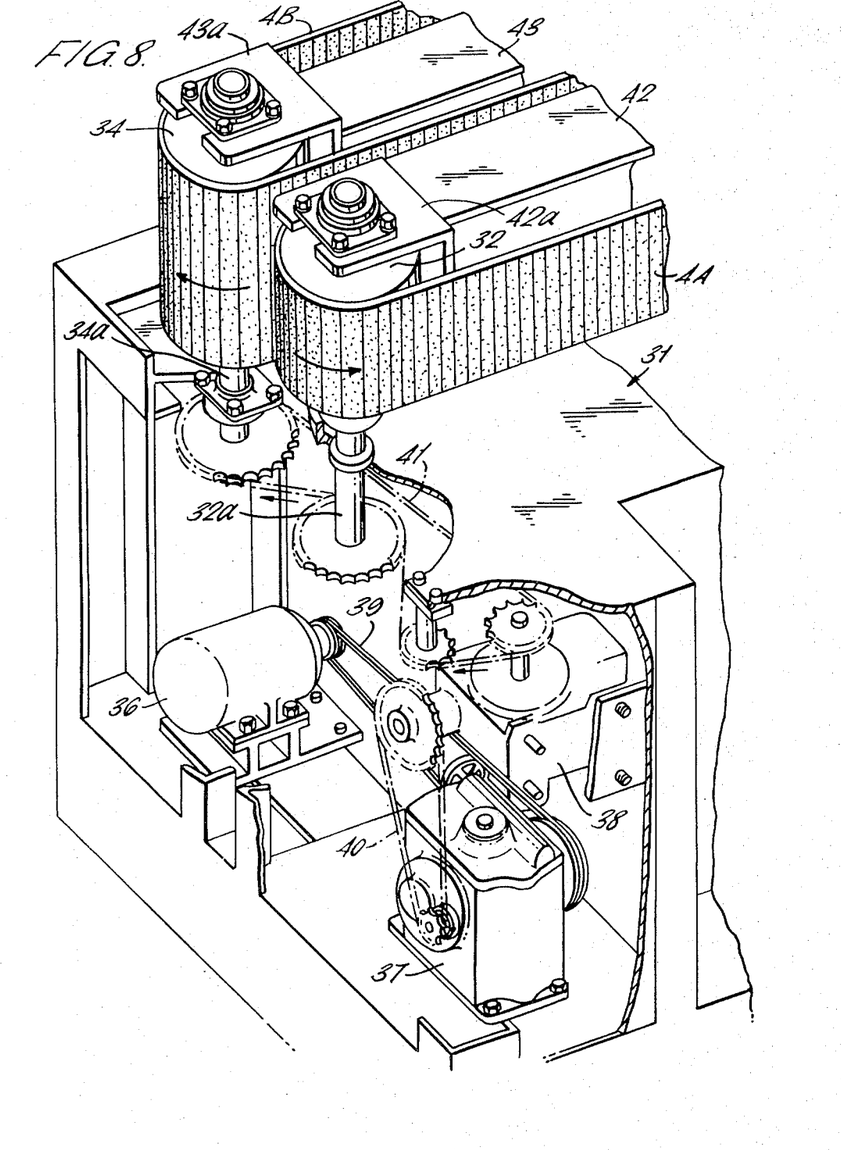
FIG. 8 is an enlarged perspective view of a driving assembly for driving a pair of belt-conveyers.

The belt-conveyers 19 and 20 comprises, as shown in FIG. 8, endles belts 4A, 4B respectively which are mounted on pulleys 32, 33 and 34, 35 provided on a base 31 respectively. As apparently seen in FIG. 6, the belt 4A is narrower in width than the belt 4B due to the presence of the grinders, said belt 4B being somewhat thinner than the former so that the belt 4B can be effectively deformed in accordance with the curved inside surface of a backing-up plate to be belowmentioned. Each of these belts are formed of rigid materials such as synthetic rubber or synthetic resin. The pulleys 32, 34 are driving pulleys respectively, the driving assembly of which are concretely shown in FIG. 8. As apparent from this drawing, the pulleys 32, 34 are driven by the prime mover 36. In other words, the rotation of the prime mover 36 is slowed down and transmitted to pulley shafts 32a, 34a by means of the first and second reduction gears 37, 38 and transmitting belts 39, 40, 41 so as to rotate the pulleys 32, 34 in the opposite direction to each other. In this case, the travelling speed of the belts 4A, 4B at the outside thereof are equal with each other, and set so as to be synchronized with the speed of the belt 11 of the belt-conveyer 10 at the glass plate feeding section A.

Each of the belt-conveyers is adapted to adjust the tension of the belt thereof, and further the belt-conveyer 19 is adapted to adjust the transverse space with relation to the other belt-conveyer 20. In other words, a shaft 32a of one pulley 32 in one belt-conveyer 19 is fitted by means of a bearing to a holding member 42 fixed on the one end of a movable frame 42 laterally movably mounted on the base 31, while a shaft 33a of the other pulley 33 is held by means of a bearing on a slide member 33b, said slide member being longitudinally slidably fitted on a holding member 42b fixed on the other end of said movable frame 42. Further, a shaft 34a of one pulley 34 in the other belt-conveyer 20 is fitted by means of a bearing on a holding member 43a fixed on one end of a fixed frame 43 fixedly mounted on the base 31, while a shaft 35a of the other pulley 35 is held by means of a slide member 35b similar to said slide member 33 b. Provided between the slide members 33b, 35b and the holding members 42b, 43b are adjustable screw stocks 44, 45 respectively, and by rotating said screw stocks the pulley shafts 33a, 35a can be longitudinally moved back and forth thus affording to control the tension of the belts 4A, 4B. On the other hand, the space of the belt-conveyer with respect to the conveyer 20 is controlled by a handle 46. By rotating said handle, a screw shaft 47 is rotated. Said rotation of the screw shaft 47 is transmitted by means of three pairs of bevel gears 48 to a screw shaft 49 for driving the movable frame 42 thus transversely moving the movable frame 42.

Figure 9:
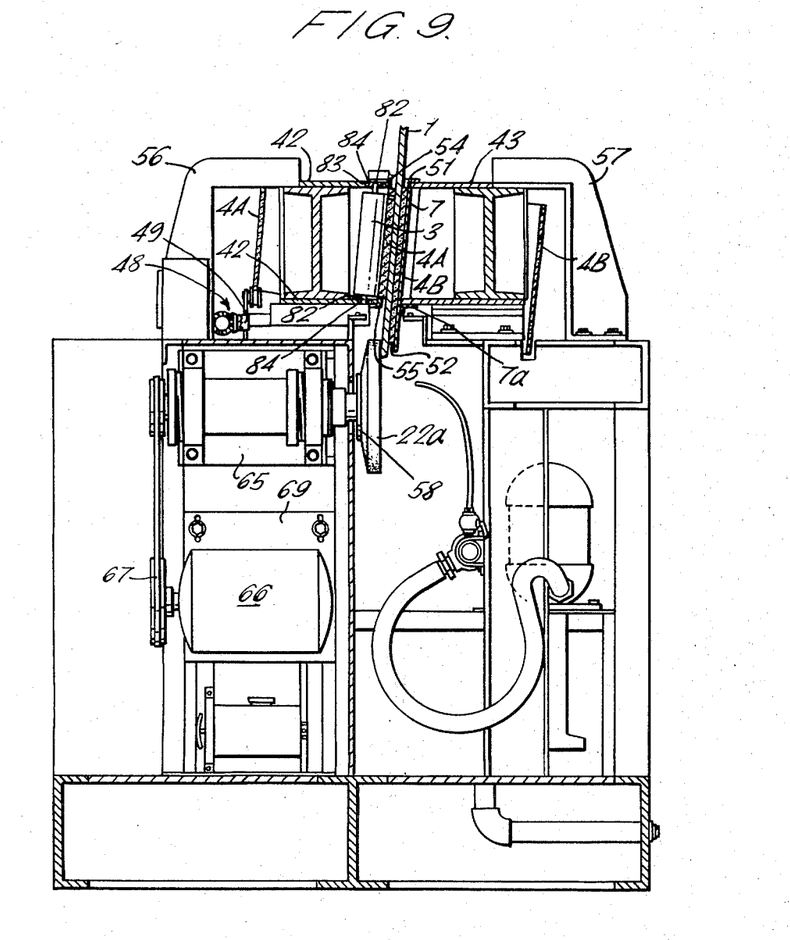
FIG. 9 is a schematic cross section of a machine of FIG. 5.
Figure 10:
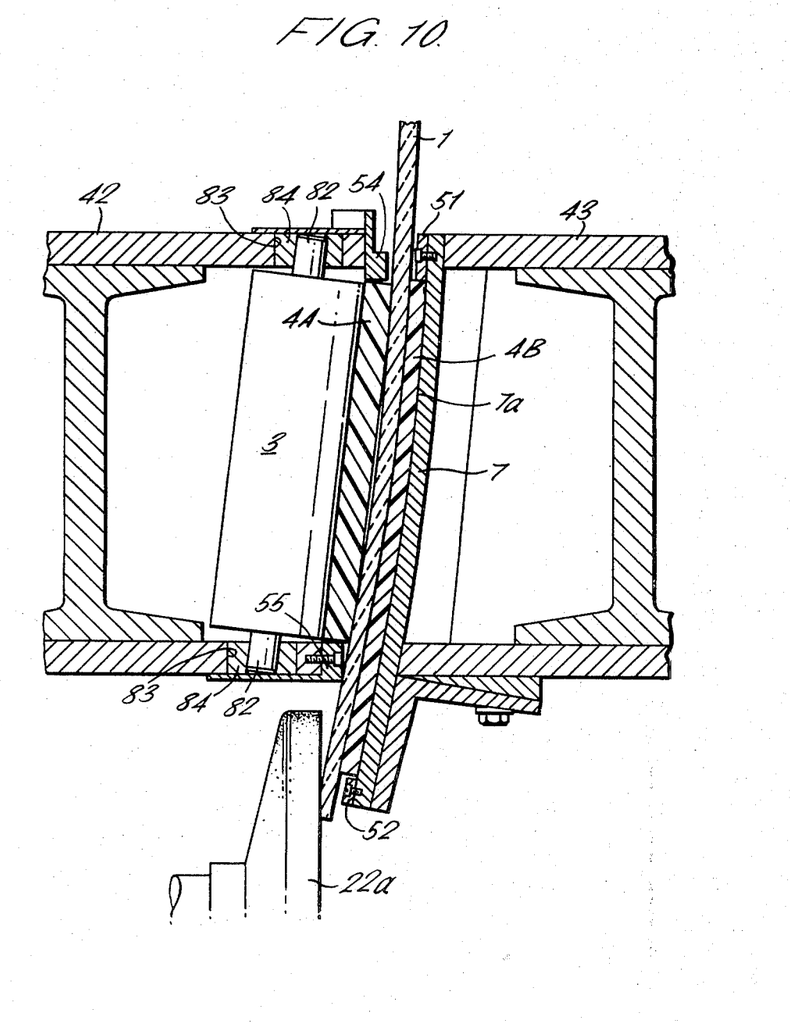
FIG. 10 is an enlarged section of the essential part of belt-conveyers of FIG. 9.
Figure 12:
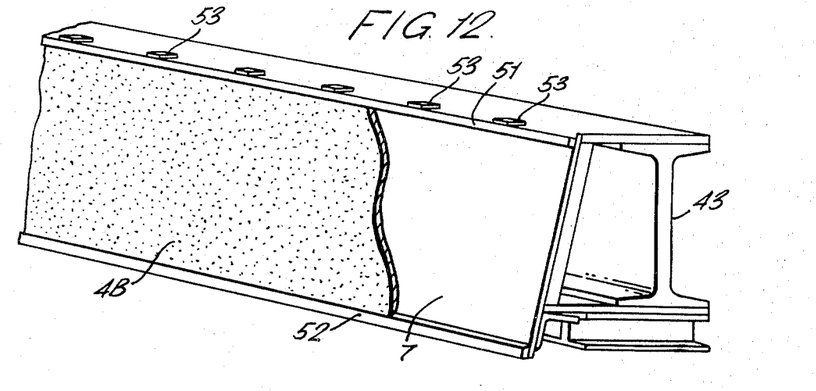
FIG. 12 is a partly cut away perspective view illustrating the fitting of a backing-up plate and a guide member.

A clamp means 50 is adapted to fix the movable frame 42 at the predetermined position, and operated by a handle 50a. Within the movable frame 42, provided are a plural number of pressing rollers 3 for pressingly supporting the belt 4A from behind. As shown in FIGS. 9, 10 and 12, each of said rollers is provided with a shaft 82 which is engaged through a resilient bush 84 with shaft holes 83. Thus the pressing roller 3 is supported by said resilient bush 84 and can move away with pressing the conveyer belt 4A with resiliency, when loaded by the feed of the glass plate 1. Said resilient bush is formed of rubbery compressive elastic materials such as rubber, soft high polymer material, and not broken easily by a little load applied thereon.

Figure 11:
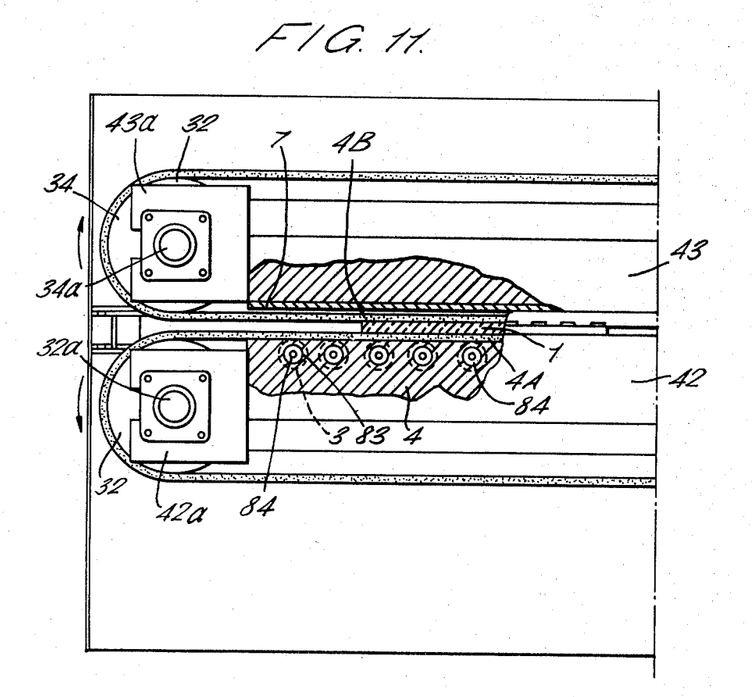
FIG. 11 is a plan view of a belt-conveyer partly cut away for illustrating a resilient bush supporting a pressing roller.

The inside surface of the belt 4B of the belt-conveyer 20 is supported by a backing-up plate 7 provided with the inside surface 7a curved slightly from the upper end to the lower end. Said backing-up plate 7 is usually formed by bending a metal plate (also may be formed by machining a relatively thick metal plate, but such machining is technically difficult and very expensive), and fixed on the fixed frame 43 as seen in FIG. 11. The backing-up plate 7 extends up and down somewhat beyond the width of the belt 4B. Provided on said upper and lower extended portions are a belt-shaped guide member 51 and a similarly belt-shaped supporting member 52. The supporting member 52 is fixedly fitted on the backing-up plate. The guide member 51 is removably mounted on the upper end surface of the belt 4B and kept in the way by a plural number of guard member 53 provided on the upper end of the backing-up plate thus affording the smooth and substantially linear motion of the travelling belt 4b with preventing the meandering and the upward derailment thereof (FIG. 12). Similarly, provided on the upper and lower end of the belt 4A of the other belt-conveyer a guide member 54 and a supporting member 55. The supporting member 55 is fixed on the lower end portion of the movable frame 42, while the supporting member 54 is fixed on the upper end portion of said frame at the position spaced a little away from the upper end face of the belt 4A.

The belts 4A, 4B are guided from outside by a plural number of upside-down-L-shaped holders 56, 57.

Figure 13:
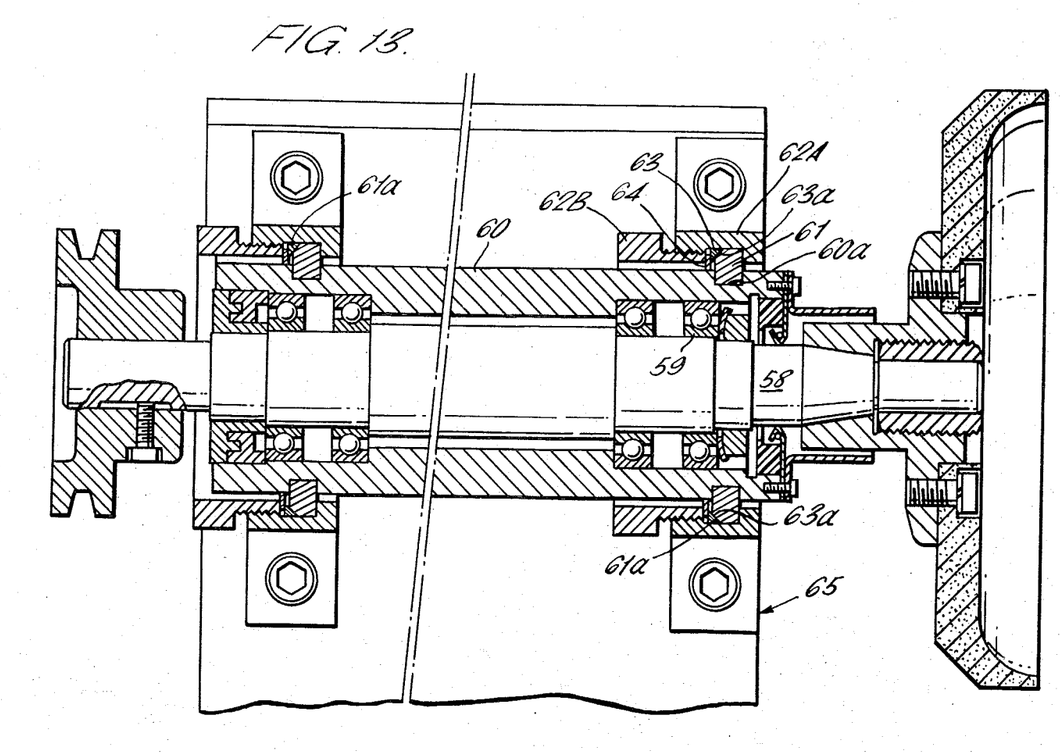
FIG. 13 is a section illustrating an embodiment of a spindle supporting assembly in a grinder.

Each of grinders 21 – 30 disposed within the base 31 below the belt-conveyer 19 is provided with a spindle supporting assembly as shown in FIG. 13. Said spindle supporting assembly comprises a supporting tube 60 fitted through a bearing 59 on the spindle 58 equipped with a grinding wheel, an annular resilient member 61 formed of elastic material and fitted into an annular groove 60a formed on the outer surface of said supporting tube 60, a holder 62A fitted through said resilient member 61 over the spindle 58 for holding the spindle, a taper ring 63 having a tapered inner wall 63a and disposed with said tapered inner wall being in contact with the bevel end face 61a of said resilient member 61, a clamp plug 62B screwed into said holder 62A and pressing the resilient member 61 through the medium of a friction ring 64 and the taper ring 63, and the friction ring 64 inserted between one end face of the clamp plug 62B and one end face of the taper ring 63 opposing to each other, the inner wall of the said friction ring being in contact with the outer surface of the supporting tube 60 while the outer wall of said friction ring is suitably spaced from the inner face of the holder 62A, said holder 62A being fixed on the frame 65 of the grinder. Due to such a structure of the supporting mechanism, the grind stones are axially and radially displacable. As apparent from FIGS. 9, 10, the inner portion of the belt 4B of the belt-conveyer 20 is fixedly supported by the backing-up plate 7. Therefore, if the reaction force applied on the grind stone from the glass plate increases abruptly in grinding due to the deformation (waved shape, for example) of the glass plate, the grind stone can escape substantially in the axial direction in correspondence with the substantially axial displacement of the spindle, so that the glass plate is prevented from intruding into the grind stone, and always ground with a uniform grinding load, thus obtaining the uniform amount of grinding and a fine finished surface.

Further, if the grinding wheel can move in the axial and radial directions, the spindle supporting assembly is not limited to the abovementioned one shown in FIG. 12, and can be substituted by another suitable supporting assembly.

Figure 7:
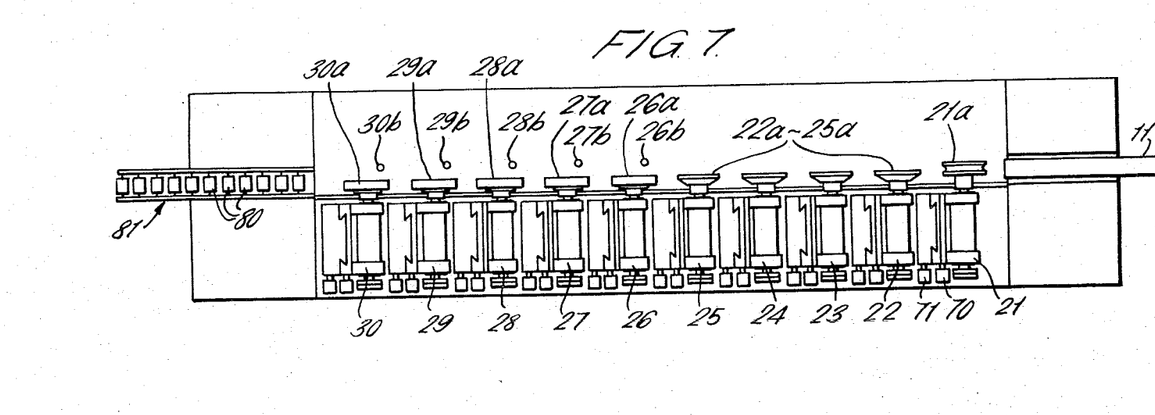
FIG. 7 is a plan view similar to FIG. 6, especially showing a grinder.

Referring now to FIG. 7, the first grinder 21 at the rightest is provided with a glass plate edge grinding wheel 21a for grinding the lower edge of glass plates fed by the belt-conveyer 10 of the feeding section A.

The second to the fifth grinders 22 – 25 are provided with face grinding wheels 22a – 25a respectively for grinding the lower end of the glass plates ground by the wheel 21 in such a manner as shown in FIG. 10. The sixth and the seventh grinders 26, 27 are provided with lapping wheels 26a, 27a respectively for lapping as intermediate finishment the glass plate faces ground by said four face grinding wheels 22a – 25a. The eighth to the tenth grinders 28 – 30 are provided with polishing wheels 28a, 29a, 30a respectively for finishment by buffing the glass plate faces lapped by the grinders 28 – 30.

Figure 14:
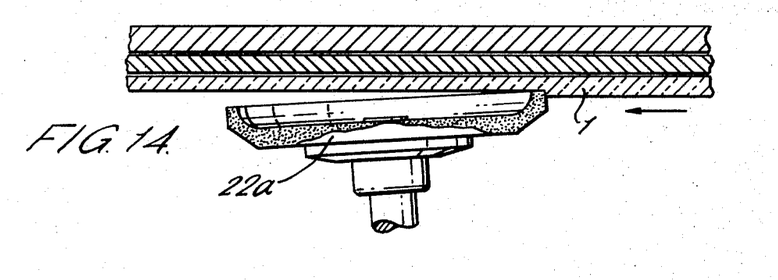
FIG. 14 is an explanatory view of a glass plate being ground by a grinding wheel.

Spindles each holding the grinding wheels 21a and 26a – 30a are disposed so that the horizontal axis of each of said spindles makes a right angle with the direction of glass plate feeding. Spindles holding the grinding wheels of the second to the fifth grinders respectively are disposed, as shown in FIG. 14, so that the horizontal axis of each spindle is suitably inclined with respect to the direction of the glass plate feeding. Of course, the supporting assembly for supporting the spindle can be pivotally fitted in a horizontal plane including the axis of said spindle so that the inclination angle of the spindle with respect to a glass plate can be changed as required.

Figure 15:
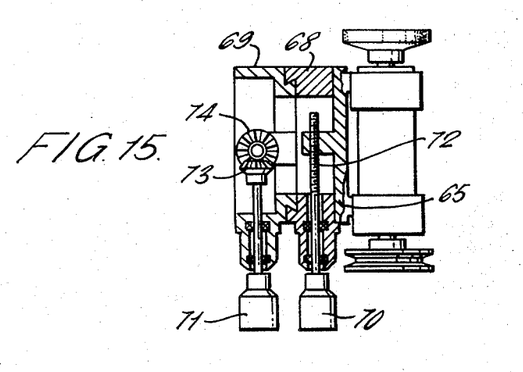
FIG. 15 is a cross-section illustrating an example of an inner structure of a grinder.

Each of the grinding wheels 21a – 30a is separately driven through a belt 67 by an electric motor 66, for example, as shown in FIG. 9. Further, the frame 65 holding the spindle supporting assembly is adapted to move both perpendicularly to the direction of glass plate feeding and vertically up and down, so that each wheel can move far from and close to and vertically to a glass plate surface. For example, shown in FIG. 15, the frame 65 is mounted slidably in the transversal direction with respect to the movable member 68, said movable member 68 being slidably mounted so as to slide upwardly and downwardly with respect to the fixed member 69. By turning a tongue 70, the frame 65 moves laterally through the function of a screw 72, while by turning a tongue 71 the movable member 68 with holding the frame 65 slides through the function of the first gear 73 and the second gear 74 upwardly and downwardly with respect to the fixed member 69. In other words, the lateral displacement of each wheel is effected by manually rotating the tongue 71. In operating the machine the wheels 21a – 25a of the first to the fifth grinders 21 – 25 are protruded in correspondence with predetermined cut-in amount already before carrying glass plates into the glass plates feeding section B, but the wheels 26a – 30a of the sixth to the tenth grinders 26 – 30 are in the position of protruding into the passage till glass plates, and automatically retracted with such a protrusion left as corresponding to the predetermined cut-in amount when the glass plate reaches the predetermined position, thus brought into contact with the glass plate surface with compressive resiliency of the annular resilient member 61 described in the abovementioned spindle supporting assembly.

Figure 16:
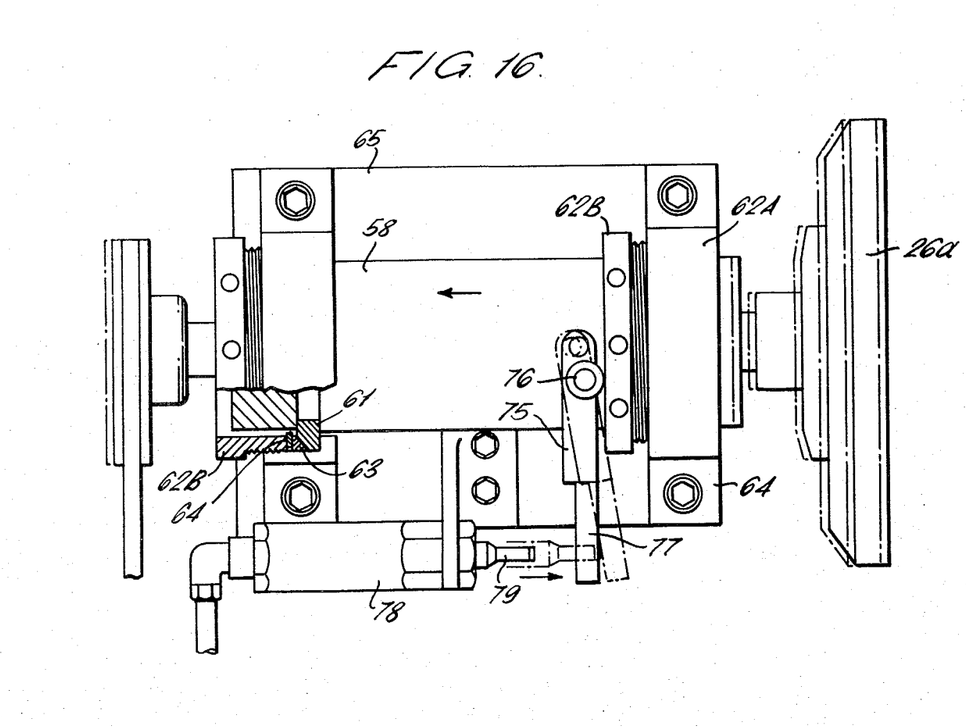
FIGS. 16 and 17 are explanatory views illustrating an example of a busher means fitted on a spindle of a grinder.
Figure 17:
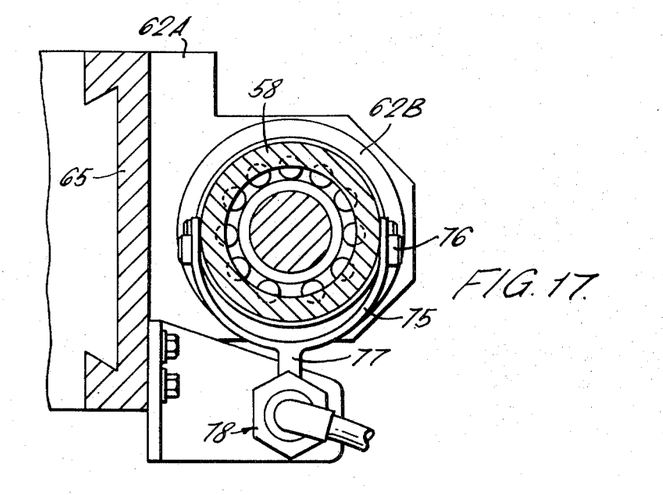

For this purpose, each of the grinders are provided with a busher means, the structure of which is shown in FIGS. 16, 17. In these drawings, the numeral 75 indicates a U-shaped arm provided with a cam on both sides thereof. This U-shaped arm 75 is provided with a connecting lever 77 which is in a position to receive the pushing-out of a piston rod 79 of an air cylinder 78. The busher mechanism shown in the drawings are in the operating position, in which the air cylinder 78 usually pushes the piston rod 79 in the direction of the arrow under pressure, and pushes the connecting lever 77 out, thus the U-shaped arm 75 pivoting forward through the connecting lever 77 about the pivotal supporting point thereof to bring the cam 74 into contact with the end face of the plug 63, so that the spindle 58 are displaced by the reaction force backward or in the direction of the arrow. Each of air cylinders 78 is operatively connected respectively to limit switches 26b – 30b so arranged as schematically shown in FIG. 7. When glass plate fed touches and turnes on the limit switch, air in the corresponding air cylinder is exhausted, thereby the piston rod 79 moves in the direction opposite to the arrow in the drawing, so that the spindle 58 moves in the opposite direction, and in other words the wheel protruding correspondently to the predetermined cut-in amount is brought into contact with the glass plate surface with resiliency of the resilient member 61 shown in the supporting assembly.

The glass plates ground in the grinding section B are transported to the delivering section C. The delivering section is provided with a roller-conveyer 81 comprising a number of rollers 80 for delivering ground glass plates with the lower end surfaces thereof on said conveyer.

In the glass plate edge grinding machine, as abovementioned, one belt of a pair of belt-conveyers is narrower in width than the other belt, said narrower belt being disposed on the side of the grinder with respect to glass plates being transported, and the lower end of the narrower belt being suitably spaced upwardly from the lower end of the glass plates, thus prevented from touching the grinding wheel to interfere with grinding operation. The other wider belt is disposed on the opposite side of the grinder with respect to the glass plates, extends adjacent to the lower end of the glass plates with the lower end of said belt being below that of abovementioned narrower belt, and supports the glass plates in cooperation with a backing-up plate which is disposed inside the wider belt and a little narrower than said wider belt. The backing-up plate is formed of a rigid substance with a smoothly curved surface from the upper end to the lower end. Therefore, when a glass plate is held between the two belts by the pressing rollers, said glass plate deforms in accordance with the curved surface of the backing-up plate. And the resistance force of the backing-up plate against the glass plate tends to be concentrated to the lower portion of the glass plate, and therefore the glass plate edge to be ground is surely held without backwardly escaping or vibrating due to the grinding load by the grind stone.

Thus, the glass plate edge is uniformly and correctly ground from the starting to the termination. In said grinding, as grinding wheel is held by an annular resilient member of vibration-absorbent property, the glass plate is prevented from cutting into the wheel, thus obtaining smooth and excellent grinding. Further, as the pressing roller for pressing glass plates has a shaft supported through a rubbery resilient bush by a fixed frame for conveyers when loaded by glass plate feeding, the roller easily changes its position and balancingly presses the glass plate 1 with the whole length thereof closely along the glass plate. Therefore glass plates are correctly fed and firmly held by the pressing roller, so that they will neither slip off from the belts nor easily change their position when grinding pressure is applied thereon.

We claim:

1. In a glass plate edge grinding machine for grinding the lower edge of a glass plate by means of a plural number of grinding wheels arranged in a series, with said glass plate being held between and transported by a pair of belt-conveyers each comprising an endless belt in such a manner that the glass plate is slightly inclined with respect to a vertical plane and supported at said inclined surface by a plural number of backing-up rollers, an improvement in which the belt of one belt-conveyer is supported by a plural number of pressing rollers arranged in a series inside said belt while the belt of the other conveyer is disposed on the opposite side with the interposition of the glass plate to the position of the arranged grinding wheels and supported all over the length thereof by a rigid backing-up plate disposed inside said belt, said backing-up plate being smoothly curved from the upper end to the lower end thereof in the direction away from the glass plate so as to face the belt of said other conveyer, the glass plate is pressed in accordance with the curved surface of the backing-up plate when held through the belt by said pressing rollers, and the spindle of each grinder holding a grinding wheel is supported by a spindle supporting assembly which enables said spindle to move substantially in the radial and axial directions.

2. A glass plate edge grinding machine as claimed in claim 1, wherein each of said pressing rollers is held through a resilient bush by a conveyer frame.

3. A glass plate edge grinding machine as claimed in claim 1, wherein the belt of one belt-conveyer is suitably narrower in width than the belt of the other conveyer, the latter belt being suitably narrower in width than said backing-up plate and in contact with said backing-up plate.

4. A glass plate edge grinding machine as claimed in claim 1, wherein said backing-up plate is provided at the lower end of said curved surface thereof with a supporting member slidably engaging with the lower end face of the travelling conveyer belt and further provided at the upper end thereof with a guide member slidably engaging with the upper end face of said conveyer-belt, at least said guide member being removably fitted on the backing-up plate.

5. A glass plate edge grinding machine as claimed in claim 1, wherein said spindle supporting assembly comprises a supporting tube fitted through a bearing on a spindle equipped with a grinding wheel, an annular resilient member formed of elastic material and fitted into an annular groove formed on the outer surface of said supporting tube, a holder fitted through said resilient member over the spindle for holding the spindle, a taper ring having a tapered inner wall and disposed with said tapered inner wall being in contact with the bevel end face of said resilient member, a clamp plug screwed into said holder and pressing the resilient member through the medium of a friction ring and the taper ring, and the friction ring inserted between one end face of the clamp plug and one end face of the taper ring opposing to each other, the inner wall of said friction ring being in contact with the outer surface of the supporting tube while the wall of said friction ring is suitably spaced from the inner face of the holder.

* * * * *